May 2, 1939. K. CLARK 2,156,801
METHOD OF AND MECHANISM FOR SEALING CAPPED CONTAINERS
Filed Dec. 18, 1936
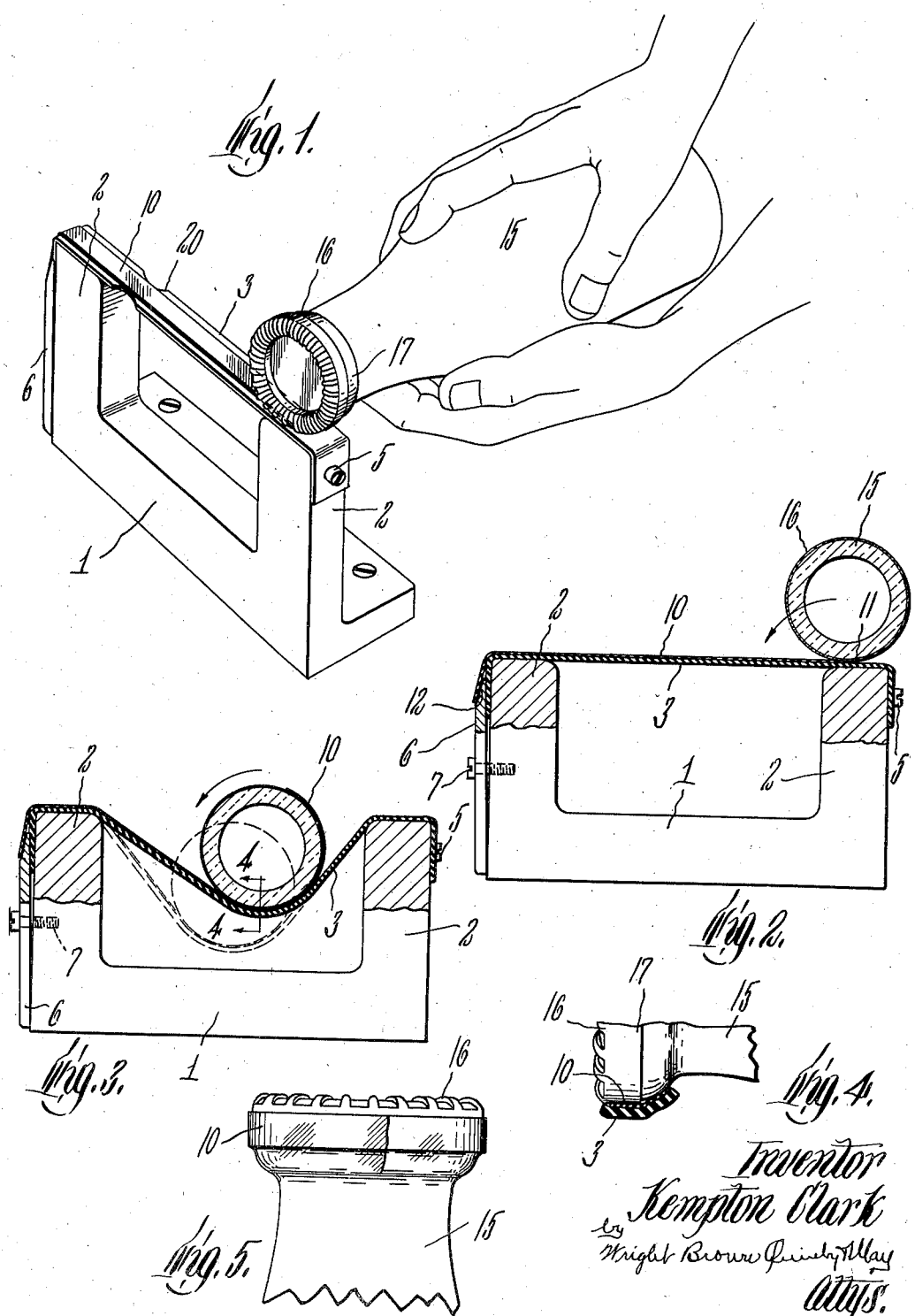

Patented May 2, 1939

2,156,801

UNITED STATES PATENT OFFICE 2,156,801

METHOD OF AND MECHANISM FOR SEALING CAPPED CONTAINERS

Kempton Clark, Little Compton, R. I., assignor to American Seal-Kap Corporation of Delaware, Long Island City, N. Y., a corporation of Delaware Application December 18, 1936, Serial No. 116,507

5 Claims. (Cl. 216—33)

This invention relates to the sealing of capped containers by wrapping therearound a stretchable and deformable sealing tape in overlapping relation to the cap margins, and under tension, the overlapping ends of the tape being secured together. There are several tape compositions which can be used for the purpose. Usually they contain rubber and some of them are self-sealing, even when cold, so that when wrapped under pressure, the overlapped ends coalesce and the strip becomes a substantially integral continuous sealing band. Being stretchable and deformable, they conform laterally to the contour of the surface about which they are wound under tension. Among material suitable for the purpose may be mentioned unvulcanized rubber compositions having high stretchability and elongation with relatively small regain or come-back after having been stretched or deformed, and may be in thin strip form, much thinner than that of the usual rubber electrician's tape. They should, moreover, be compounded from materials which are not injurious to food products, being free from lead compounds commonly employed in the manufacture of electrician's tape. Another composition which can be used for the purpose is known to the trade as "Parafilm" and is a combination of paraffin and rubber which have been compounded together, as shown, for example in Patents No. 2,054,114 and No. 2,054,115, granted September 15, 1936.

In accordance with this invention, the sealing tape is applied to the surface of a stretchable band to which it will not adhere, at least with any great tenacity, and by suitable manipulation the band is caused to be stretched, and with it, the sealing tape, which is pressed by the band against the container in sealing relation to the container and cap while the tape is being wound therearound.

For a more complete understanding of this invention, reference may be had to the accompanying drawing in which Figure 1 is a perspective view of a simple form of apparatus for facilitating the practice of the method of this invention, the container to be sealed being shown in starting position.

Figure 2 is an end elevation partly broken away and in section of the same.

Figure 3 is a view similar to Figure 2, except that the container is shown in subsequent positions during the application of the tape.

Figure 4 is a detail section to a larger scale on line 4—4 of Figure 3.

Figure 5 is a fragmentary side elevation of the sealed and capped container.

Referring to the drawing, at 1 is indicated a frame having a pair of spaced supports 2, across the upper ends of which is positioned a stretchable band 3 with freedom to yield laterally of its length between the supports. This band may well be made of soft vulcanized rubber or rubber composition. As shown it is secured to one of the supports 2, as by means of a screw 5, and at its other end it is shown as extending between a clamp jaw 6 and the outer face of this support. The clamp 6 may be secured in position, as by a screw 7.

In operation a sealing strip 10 is applied in substantially unstretched condition longitudinally to the top face of the band 3, which may be under some tension, in lengthwise relation thereto and it may be temporarily secured spaced from its free end 11. As shown the outer face of the clamp 6 adjacent to its upper end is formed beveled and slightly roughened, as at 12, this surface being such that when the strip 10 is pressed thereagainst it is caused to adhere to a sufficient extent.

In operation, a container such as a milk bottle 15, provided with a cap 16 having a skirt 17 engaging over the outside of the bottle, is placed on one of the supports 2, as shown in Figures 1 and 2, engaging the free end portion 11 of the strip 10, so that the strip 10 adheres slightly thereto, and in overlapping relation to the container and the edge of the skirt 17 of the cap. Then by rolling the capped container toward the opposite support 2, and pressing it between the supports to tension the applying band and also the tape or strip 10, this tape is progressively wound about and conformed to the bottle top in sealing relation to the lower edge of the cap skirt, the band applying continuous and progressive facial pressure against the tape to assist in such conformation. The bottle is shown in successive positions in full and dotted lines, respectively, in Figure 3. The stretching of the band and tape is sufficient so that when the bottle is rolled onto the opposite support 2, the sealing tape has been wound fully around the container and its cap and with its trailing end overlapping its free end 11, so that the bottle is completely sealed to its cap as shown in Figure 5. The initial tension of the band 3 and the extent to which it is deflected from its straight condition determines the amount of facial pressure which it exerts on the tape during the application of the tape to the cap and container.

If desired, provision may be made for automatically breaking the sealing tape at the proper place so that its ends may overlap when the winding has been completed. This may be done by reducing the cross section of the band 3 adjacent to the finishing support 2, as by narrowing it as shown at 20 in Figure 1. This provides a localized stretch or elongation of the band and the sealing strip much in excess of that which takes place toward the starting support 2, and this may be sufficient to cause rupture of the sealing strip or tape opposite to the reduced cross section portion.

Where the strip or tape is of a self-sealing nature, the overlapping ends will coalesce together under the pressure exerted by the stretched band 3, thus to form substantially an integral elastic sealing ring around the container in overlapping relation to the cap skirt.

From the foregoing description of the method and an apparatus to facilitate the carrying out of this method, it should be understood by those skilled in the art that various changes and modifications may be made without departing from the spirit or scope of this invention as defined by the appended claims.

I claim:

1. The method of sealing a capped container which comprises placing in superposed relation a stretchable sealing strip and a stretchable strip-applying band, and then effecting a rolling traverse between said capped container and said band with said strip in overlapping contact with said container and cap margin and while said band and strip are held under tension.

2. The method of sealing a capped container, which comprises placing in superposed relation a stretchable sealing strip in substantially unstretched condition and a stretchable strip-applying band, contacting a free end of said sealing strip with a container in overlapping relation to its cap, and relatively rolling said container and cap along said strip and band while applying tension to both to thereby stretch said strip and progressively press and wrap it about said container and cap under the pressure of said band thereon.

3. The method of sealing a capped container, which comprises wrapping said container in overlapping relation to its cap in a tensioned strip of stretchable sealing tape while continuously and progressively applying pressure against the outer face of said strip where it is being applied.

4. Apparatus for sealing capped containers, which comprises a stretchable band, means for supporting said band at lengthwise spaced points with freedom to yield laterally of its length between said points, and means for engaging a stretchable sealing tape spaced from one end and overlying said band.

5. Apparatus for sealing capped containers, which comprises a stretchable band, means for supporting said band at lengthwise spaced points, and means for holding a stretchable sealing tape spaced from one end and overlying said band, said band having a portion of reduced cross section adjacent to said engaging means to localize a stretching of said band and strip spaced from said one end sufficient to effect parting of said strip.

KEMPTON CLARK.